Figure 1A:
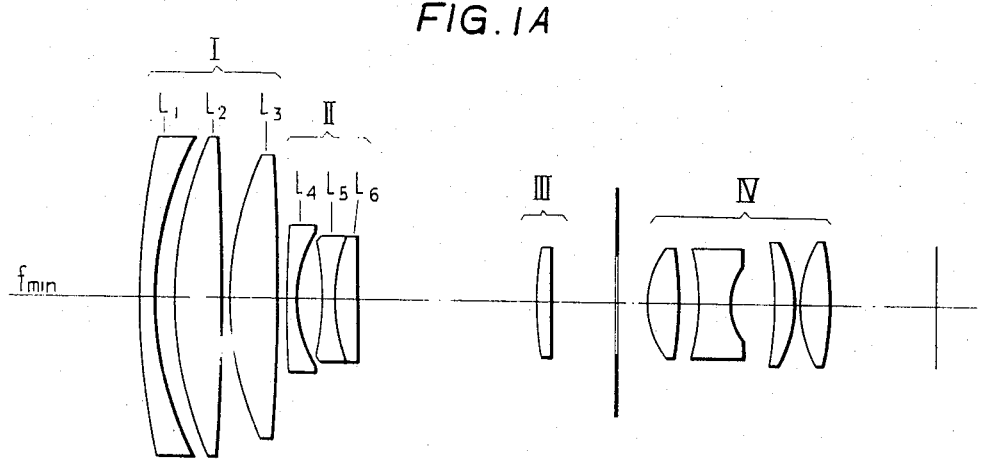

United States Patent
Muszumanski et al.

[11] 3,784,283
[45] Jan. 8, 1974

[54] ZOOM LENS FOR SUPER-8 FILM

[75] Inventors: Trude Muszumanski, Vienna; Helmut Gela, Maria-Enzersdorf, both of Austria

[73] Assignees: Karl Vockenhuber; Raimund Hauser, both of Vienna, Austria

[22] Filed: Apr. 14, 1971

[21] Appl. No.: 133,818

[30] Foreign Application Priority Data
Apr. 17, 1970  Austria.....................3533/70

[52] U.S. Cl................................. 350/184, 350/214
[51] Int. Cl. ........................................... G02b 15/16
[58] Field of Search............................ 350/184, 186

[56] References Cited
UNITED STATES PATENTS
| | | | |
|---|---|---|---|
| 3,580,662 | 5/1971 | Scholz | 350/184 |
| 3,074,317 | 1/1963 | Cox et al. | 350/186 |
| 3,506,337 | 4/1970 | Takahashi | 350/184 |

Primary Examiner—John K. Corbin
Attorney—Ernest G. Montague

[57] ABSTRACT

A main lens unit having a fixed focal length and consisting of a positive lens member is preceded by an afocal forward lens unit having a variable magnification and consisting of a positive forward lens member, a negative intermediate lens member which is axially movable to change the magnification, and a positive rear lens member. The intermediate lens member is arranged to direct divergent bundles of rays to said rear lens member. The rear lens member is arranged to convert said divergent bundles of rays into bundles of rays which are substantially parallel to the optical axis of the lens and to direct them to said main lens unit. The forward lens member is axially movable to control the position of the image plane. The lens is designed to meet the condition $$f_{min} - f_{II} < 6y$$

where $f_{min}$ is the smallest focal length of the lens, $f_{II}$ the focal length of the intermediate lens member, and $2y$ the image field diagonal.

4 Claims, 4 Drawing Figures

ZOOM LENS FOR SUPER-8 FILM

This invention relates to a zoom lens, particularly a camera lens, preferably a lens for Super-8 film, which lens comprises an afocal forward lens unit having a variable magnification and a main lens unit having a fixed focal length. The forward lens unit comprises a positive forward lens member, which is succeeded by a negative intermediate lens member and a positive rear lens member, and the main lens unit consists of a positive lens member. For a change of the magnification, the negative intermediate lens member is slidable along the optical axis and the forward lens member performs the compensating movement required to maintain the image in the same position. The divergent bundles of rays behind the second lens member leave the positive third lens member in a direction which is substantially parallel to the axis and pass through the diaphragm area to the main lens unit.

In conventional lenses of this kind it has been difficult to reduce the mechanical dimensions, namely, th overall length of the lens and the diameter of the forward lens ember unless the performance was adversely affected. The performance of a zoom lens may be defined by a performance number Z, which can be calculated by the formula $$Z = 2 y\, D/f_{min}$$

where $2y$ is the image field diagonal, $D$ the zoom ratio and $f_{min}$ the smallest focal length of the lens. As is known, the zoom ratio defines the ratio of the largest to the smallest focal length. If the zoom ratio and the smallest focal length are predetermined, the diameter of the forward lens member will depend in the lenses of the type in question on the overall length of the lens and that overall length will highly depend on the negative focal length of the intermediate lens member. To some extent, the overall length may be influenced by the ratio of the focal length of the forward lens member to the focal length of the main lens unit. Although this ratio may be freely chosen, a relatively long focal length of the main lens unit is preferably associated with a relatively short focal length of the forward lens member. As a result, there may be a negative distance between infinitesimally thin lens elements which replace the forward and intermediate lens members. Such arrangement will reduce the overall length of the lens but will require that the forward lens member is a wide-angle member which has a rear cardinal point disposed outside the forward lens member. This arrangement involves structurally expensive forward lens members and a main lens unit having a relatively large focal length so that with a given relative aperture the bundles of rays are relatively large in diameter in the diaphragm space. For this reason, small mechanical dimensions cannot be obtained at this point.

It is an object of the invention to provide a simple zoom lens, which can be manufactured economically and while exhibiting only a small decrease in brightness toward the edge of the image distinguishes from known lenses of comparable type and having a comparable performance by smaller mechanical dimensions and, if possible, a higher performance number Z. This is accomplished according to the invention in that the focal length of the intermediate lens member is selected to comply with the condition $$f_{min} - f_{II} < 6y$$

wherein $f_{min}$ is the smallest focal length of the lens, $f_{II}$ is the focal length of the intermediate lens member and $2y$ is the image field diagonal so that $6y$ is three times the image field diagonal and that the performance number is preferably $Z \geq 1.9$. To eliminate image errors, the forward lens member and the negative intermediate lens member consist preferably of three lens elements each. This is not inconsistent with the requirement for an inexpensive and simple structure because the focusing power is shared by a plurality of surfaces so that the lens elements may have such a shape that they can easily be manufactured and may be made from glasses which have indices of refraction and Abbe numbers that are far from any extreme so that the costs are reasonable too. Besides, none of the lens elements forming the forward and intermediate lens members has a center thickness in excess of 20 percent of the diameter of the respective lens element.

Figure 1B:
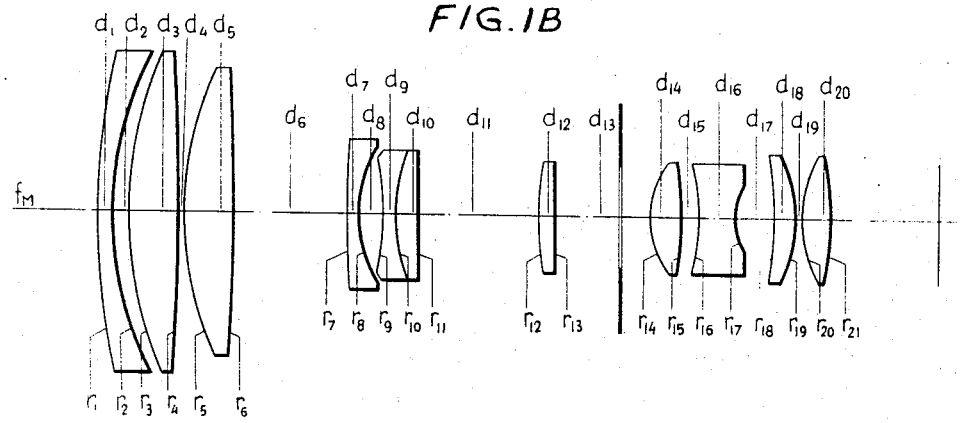
Figure 1C:
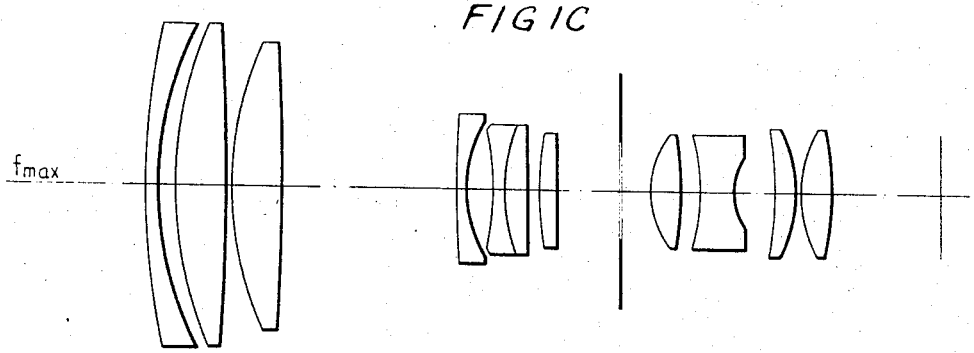
Figure 2:
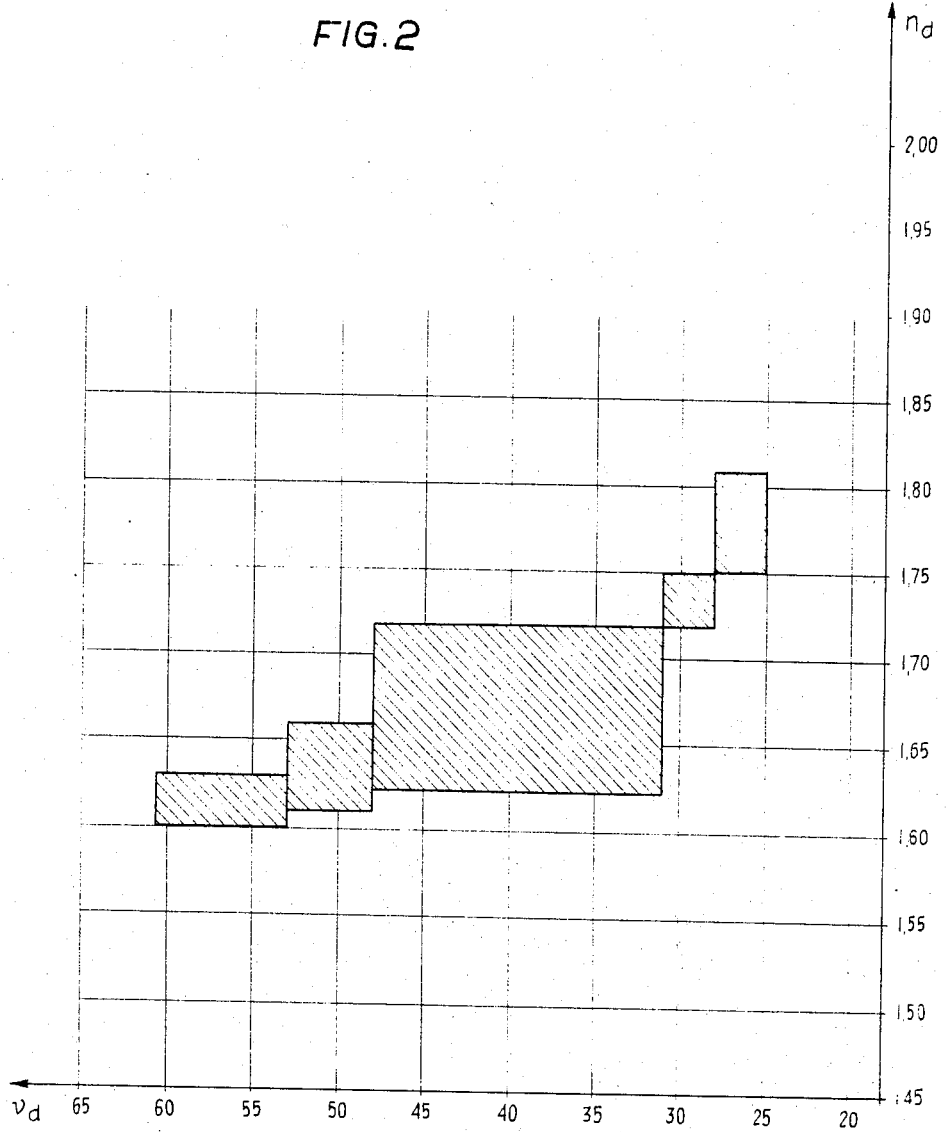

Further features and advantages of the invention will become apparent from the following description of embodiments with reference to the drawing, in which FIGS. 1A–1C are sectional views showing one embodiment and FIG. 2 is a diagram which represents the ratio $n_d : \nu_d$ of the glasses used in a zoom supplement used according to the invention.

Example I

FIGS. 1A–1C are sectional views showing a first embodiment in positions corresponding to three focal lengths. The lens has a zoom ratio of more than 3 and a minimum focal length which is about 1.3 times the image field diagonal. The free diameter of the foremost lens element is extremely small and does not exceed twelve times the performance number Z. In comparable lenses also designed with a view to small dimensions that diameter in millimeters is more than 14 times the performance number. The lens is excellently corrected throughout its focal length range. The image has a high contrast and a high resolution and is flat as far as to the edge and free of color errors and distortion in any focal length setting. The performance number Z is 2.39.

In the following Tables I and II, $r_1$ to $r_{21}$ are in millimeters the radii of curvature of boundary surfaces of lens elements, $d_1$ to $d_{20}$ are in millimeters the distances between adjacent vertices of adjacent boundary surfaces of lens elements, $n_{d_1}$ to $n_{d_{11}}$ are the indices of refraction and $\nu_{d_1}$ to $\nu_{d_{11}}$ are the Abbe numbers of the lens elements, all in a succession from the forward end to the rear end of the lens. Except where otherwise stated, these data are applicable to a setting for a mean focal length $f_M$, which is the geometric mean of the shortest focal length $f_{min}$ and the longest focal length $f_{max}$ of the lens. $s'$ is the back focal length and $2y$ the image field diagonal.

TABLE I

| | | | |
|---|---|---|---|
| $r_1$ +5.308 | $d_1$ = 0.08 | $n_{d_1}$ = 1.805 | $\nu_{d_1}$ = 25.4 |
| $r_2$ +1.750 | $d_2$ = 0.07 | | |
| $r_3$ +2.104 | $d_3$ = 0.28 | $n_{d_2}$ = 1.603 | $\nu_{d_2}$ = 60.6 |
| $r_4$ −25.054 | $d_4$ = 0.01 | | |
| $r_5$ +1.660 | $d_5$ = 0.28 | $n_{d_3}$ = 1.658 | $\nu_{d_3}$ = 50.9 |

Table I—Continued

| $r_6$ — 30.293 | $d_6 = \begin{cases} 0.05......f_{min} \\ 0.62......f_M \\ 0.94......f_{max} \end{cases}$ | | |
|---|---|---|---|
| $r_7 + 7.378$ | $d_7 = 0.06$ | $n_{d_4} = 1.658$ | $d_4 = 50.9$ |
| $r_8 + 0.648$ | $d_8 = 0.14$ | | |
| $r_9 - 1.310$ | $d_9 = 0.06$ | $n_{d_5} = 1.670$ | $d_5 = 47.1$ |
| $r_{10} + 0.800$ | $d_{10} = 0.14$ | $n_{d_6} = 1.805$ | $d_6 = 25.4$ |
| $r_{11} + 23.022$ | $d_{11} = \begin{cases} 0.96......f_{min} \\ 0.64......f_M \\ 0.07......f_{max} \end{cases}$ | | |
| $r_{12} + 1.767$ | $d_{12} = 0.10$ | $n_{d_7} = 1.689$ | $d_7 = 49.5$ |
| $r_{13} - 17.389$ | $d_{13} = 0.50$ | | |
| $r_{14} + 0.544$ | $d_{14} = 0.18$ | $n_{d_8} = 1.713$ | $d_8 = 53.8$ |
| $r_{15} - 5.043$ | $d_{15} = 0.11$ | | |
| $r_{16} - 0.985$ | $d_{16} = 0.20$ | $n_{d_9} = 1.785$ | $d_9 = 26.1$ |
| $r_{17} + 0.474$ | $d_{17} = 0.20$ | | |
| $r_{18} - 2.559$ | $d_{18} = 0.12$ | $n_{d_{10}} = 1.641$ | $d_{10} = 60.1$ |
| $r_{19} - 0.744$ | $d_{19} = 0.01$ | | |
| $r_{20} + 0.690$ | $d_{20} = 0.17$ | $n_{d_{11}} = 1.641$ | $d_{11} = 60.1$ |
| $r_{21} - 4.020$ | $s' = 0.59$ $f_{min} = 0.575$ $f_M = 1.018$ $f_{max} = 1.800$ $2y = 0.440$ | | |

It is apparent from FIG. 2 that the glasses which may be used to make the lens elements $L_1$ to $L_6$ of the first and second lens members need not meet high requirements as regards the index of refraction or the Abbe number. The hatched fields represent the values of $n_d$ and $\nu_d$ of the glasses used for lens elements $L_1$ to $L_6$. It is apparent that none of these glasses has an Abbe number which is less than 25 or higher than 61. The following values are apparent for Table II Glasses for which $25 < \nu_d < 28$: $1.75 \leq n_d \leq 1.810$
Glasses for which $28 < \nu_d < 31$: $1.717 \leq n_d \leq 1.75$
Glasses for which $31 < \nu_d < 48$: $1.624 \leq n_d \leq 1.717$
Glasses for which $48 < \nu_d < 53$: $1.610 \leq n_d \leq 1.660$
Glasses for which $53 < \nu_d < 61$: $1.600 \leq n_d \leq 1.630$

Example II

The lens defined in the subsequent Table II has a zoom ratio of about 2.6 and its smallest focal length is about 1.4 times the image field diagonal. In this case too, the free diameter of the foremost lens element in millimeters does not exceed 12 times the performance number Z. The lens is also excellently corrected throughout the focal length range; the image has a high contrast and a high resolution in any focal length setting and is flat as far as to the edge and free of color errors and distortion. To enable the use of lens member IV of Example I as a main lens unit, the zoom supplement has been designed to have substantially the same residual errors as the supplement of Example I.

TABLE II

| | | | |
|---|---|---|---|
| $r_1 + 4.661$ | $d_1 = 0.07$ | $n_{d_1} = 1.805$ | $d_1 = 25.4$ |
| $r_2 + 1.423$ | $d_2 = 0.05$ | | |
| $r_3 + 1.567$ | $d_3 = 0.25$ | $n_{d_2} = 1.604$ | $d_2 = 53.6$ |
| $r_4 - 25.437$ | $d_4 = 0.01$ | | |
| $r_5 + 1.427$ | $d_5 = 0.25$ | $n_{d_3} = 1.624$ | $d_3 = 47.0$ |
| $r_6 - 25.437$ | $d_6 = \begin{cases} 0.05......f_{min} \\ 0.48......f_M \\ 0.74......f_{max} \end{cases}$ | | |
| $r_7 + 64.139$ | $d_7 = 0.06$ | $n_{d_4} = 1.717$ | $d_4 = 48.0$ |
| $r_8 + 0.646$ | $d_8 = 0.14$ | | |
| $r_9 - 1.254$ | $d_9 = 0.05$ | $n_{d_5} = 1.622$ | $d_5 = 53.2$ |
| $r_{10} + 0.710$ | $d_{10} = 0.14$ | $n_{d_6} = 1.755$ | $d_6 = 27.6$ |
| $r_{11}$ flat | | | |
| | $d_{11} = \begin{cases} 0.78......f_{min} \\ 0.52......f_M \\ 0.09......f_{max} \end{cases}$ | | |
| $r_{12} + 1.967$ | $d_{12} = 0.10$ | $n_{d_7} = 1.623$ | $d_7 = 58.1$ |
| $r_{13} - 4.076$ | $d_{13} = 0.50$ | | |
| $r_{14} + 0.544$ | $d_{14} = 0.18$ | $n_{d_8} = 1.713$ | $d_8 = 53.8$ |
| $r_{15} - 5.043$ | $d_{15} = 0.11$ | | |
| $r_{16} - 0.985$ | $d_{16} = 0.20$ | $n_{d_9} = 1.785$ | $d_9 = 26.1$ |
| $r_{17} + 0.474$ | $d_{17} = 0.20$ | | |
| $r_{18} - 2.559$ | $d_{18} = 0.12$ | $n_{d_{10}} = 1.641$ | $d_{10} = 60.1$ |
| $r_{19} - 0.744$ | $d_{19} = 0.01$ | | |
| $r_{20} + 0.690$ | $d_{20} = 0.17$ | $n_{d_{11}} = 1.641$ | $d_{11} = 60.1$ |
| $r_{21} - 4.020$ | $f_{min} = 0.606$ $f_M = 0.979$ $f_{max} = 1.581$ $2y = 0.440$ | | |

The data in Tables I and II are subject to the following tolerances: The curvature of individual surfaces may vary to an extent corresponding to a variation of the focusing power of the respective lens member by ±10 percent; the thicknesses may vary up to ±10 percent of the respective lens member; the refractive indices may vary by up to ±0.03 and the Abbe numbers by up to ±5.

What is claimed is:

1. A zoom lens, which comprises
   a main lens unit having a fixed focal length and consisting of a positive lens member, and
   an afocal forward lens unit preceding said main lens unit and having a variable magnification,
   said forward lens unit consisting of a positive forward lens member, a negative intermediate lens member which is axially movable to change the magnification, and a positive rear lens member,
   the positive forward lens member of the afocal part consists of a negative meniscue lens element convex towards the front followed by two biconvex lens elements,
   said negative intermediate lens member consists of a negative meniscue convex toward the front followed by a negative doublet composed of a biconcave lens cemented to a positive lens element,
   said positive rear lens member consists of a biconvex lens element, said intermediate lens member being arranged to direct divergent bundles of rays to said rear lens member, said rear lens member being arranged to convert said divergent bundles of rays into bundles of rays which are substantially parallel to the optical axis of the lens and to direct them to said rear lens member, said forward lens member being axially movable to control the position of the image plane, and said lens being designed to meet the condition $$f_{min} - f_{II} < 6y$$

where $f_{min}$ is the smallest focal length of the lens, $f_{II}$ the focal length of said intermediate lens member, and $2y$ the image field diagonal.

2. A zoom lens as set forth in claim 1, which lens elements define a performance number $Z = 2y\,D/f_{min}$ of at least 1.9, where $2y$ is the image field diagonal, $D$ the zoom ratio and $f_{min}$ the smallest focal length of the lens.

3. A zoom lens which comprises a main lens unit having a fixed focal length and consisting of a positive lens member, and an afocal forward lens unit preceding said main lens unit and having a variable magnification, said forward lens unit consisting of a positive forward lens member, a negative intermediate lens member which is axially movable to change the magnification, and a positive rear lens member, said intermediate lens member being arranged to direct divergent bundles of rays to said rear lens member, said rear lens member being arranged to convert said divergent bundles of rays into bundles of rays which are substantially parallel to the optical axis of the lens and to direct them to said rear lens member, said forward lens member being axially movable to control the position of the image plane, said lens being designed to meet the condition $$f_{min} - f_{II} < 6y$$

where $f_{min}$ is the smallest focal length of the lens, $f_{II}$ the focal length of said intermediate lens member, and $2y$ the image field diagonal, said forward lens member consists of three lens elements, said intermediate lens member consists of three lens elements, said zoom lens having the following data:

| | | | |
|---|---|---|---|
| $r_1 + 5.308$ | $d_1 = 0.08$ | $n_{d_1} = 1.805$ | $\nu_{d_1} = 25.4$ |
| $r_2 \pm 1.750$ | $d_2 = 0.07$ | | |
| $r_3 + 2.104$ | $d_3 = 0.28$ | $n_{d_2} = 1.603$ | $\nu_{d_2} = 60.6$ |
| $r_4 - 25.054$ | $d_4 = 0.01$ | | |
| $r_5 + 1.660$ | $d_5 = 0.28$ | $n_{d_3} = 1.658$ | $\nu_{d_3} = 50.9$ |
| $r_6 - 30.293$ | $d_6 = \begin{cases}0.05......f_{min}\\0.62......f_M\\0.94......f_{max}\end{cases}$ | | |
| $r_7 + 7.378$ | $d_7 = 0.06$ | $n_{d_4} = 1.658$ | $\nu_{d_4} = 50.9$ |
| $r_8 + 0.648$ | $d_8 = 0.14$ | | |
| $r_9 - 1.310$ | $d_9 = 0.06$ | $n_{d_5} = 1.670$ | $\nu_{d_5} = 47.1$ |
| $r_{10} + 0.800$ | $d_{10} = 0.14$ | $n_{d_6} = 1.805$ | $\nu_{d_6} = 25.4$ |
| $r_{11} + 23.022$ | $d_{11} = \begin{cases}0.96......f_{min}\\0.64......f_M\\0.07......f_{max}\end{cases}$ | | |
| $r_{12} + 1.767$ | $d_{12} = 0.10$ | $n_{d_7} = 1.689$ | $\nu_{d_7} = 49.5$ |
| $r_{13} - 17.389$ | $d_{13} = 0.50$ | | |
| $r_{14} + 0.544$ | $d_{14} = 0.18$ | $n_{d_8} = 1.713$ | $\nu_{d_8} = 53.8$ |
| $r_{15} - 5.043$ | $d_{15} = 0.11$ | | |
| $r_{16} - 0.985$ | $d_{16} = 0.20$ | $n_{d_9} = 1.785$ | $\nu_{d_9} = 26.1$ |
| $r_{17} + 0.474$ | $d_{17} = 0.20$ | | |
| $r_{18} - 2.559$ | $d_{18} = 0.12$ | $n_{d_{10}} = 1.641$ | $\nu_{d_{10}} = 60.1$ |
| $r_{19} - 0.744$ | $d_{19} = 0.01$ | | |
| $r_{20} + 0.690$ | $d_{20} = 0.17$ | $n_{d_{11}} = 1.641$ | $\nu_{d_{11}} = 60.1$ |
| $r_{21} - 4.020$ | $s' = 0.59$ | | |
| | $f_{min} = 0.575$ | | |
| | $f_M = 1.018$ | | |
| | $f_{max} = 1.800$ | | |
| | $2y = 0.440$ | | | where $r_1$ to $r_{21}$ are in millimeters the radii of curvature of boundary surfaces of lens elements, $d_1$ to $d_{20}$ are in millimeters the distances between adjacent vertices of adjacent boundary surfaces of lens elements, $n_{d_1}$ to $n_{d_{11}}$ are the indices of refraction and $\nu_{d_1}$ to $\nu_{d_{11}}$ are the Abbe numbers of the lens elements, all in a succession from the forward end to the rear end of the lens, $s'$ is the back focal length and $2y$ the image diagonal, and which data unless otherwise stated are applicable to a setting for a mean focal length $f_M$, which is the geometric mean of the shortest focal length $f_{min}$ and the longest focal length $f_{max}$ of the lens.

4. A zoom lens, which comprises a main lens unit having a fixed focal length and consisting of a positive lens member, and an afocal forward lens unit preceding said main lens unit and having a variable magnification, said forward lens unit consisting of a positive forward lens member, a negative intermediate lens member which is axially movable to change the magnification, and a positive rear lens member, said intermediate lens member being arranged to direct divergent bundles of rays to said rear lens member, said rear lens member being arranged to convert said divergent bundles of rays into bundles of rays which are substantially parallel to the optical axis of the lens and to direct them to said rear lens member, said forward lens member being axially movable to control the position of the image plane, said lens being designed to meet the condition $f_{min} - f_{II} < 6y$ where $f_{min}$ is the smallest focal length of the lens, $f_{II}$ the focal length of said intermediate lens member, and $2y$ the image field diagonal, said forward lens member consists of three lens elements, said intermediate lens member consists of three lens elements, said zoom lens having the following data:

| | | | |
|---|---|---|---|
| $r_1 + 4.661$ | | | |
| | $d_1 = 0.07$ | $n_{d_1} = 1.805$ | $\nu_{d_1} = 25.4$ |
| $r_2 + 1.423$ | | | |
| | $d_2 = 0.05$ | | |
| $r_3 + 1.567$ | | | |
| | $d_3 = 0.25$ | $n_{d_2} = 1.604$ | $\nu_{d_2} = 53.6$ |
| $r_4 - 25.437$ | | | |
| | $d_4 = 0.01$ | | |
| $r_5 + 1.427$ | | | |
| | $d_5 = 0.25$ | $n_{d_3} = 1.624$ | $\nu_{d_3} = 47.0$ |
| $r_6 - 25.437$ | | | |
| | $d_6 = \begin{cases} 0.05 \ldots f_{min} \\ 0.48 \ldots f_M \\ 0.74 \ldots f_{max} \end{cases}$ | | |
| $r_7 + 64.139$ | | | |
| | $d_7 = 0.06$ | $n_{d_4} = 1.717$ | $\nu_{d_4} = 48.0$ |
| $r_8 + 0.646$ | | | |
| | $d_8 = 0.14$ | | |
| $r_9 - 1.254$ | | | |
| | $d_9 = 0.05$ | $n_{d_5} = 1.622$ | $\nu_{d_5} = 53.2$ |
| $r_{10} + 0.710$ | | | |
| | $d_{10} = 0.14$ | $n_{d_6} = 1.755$ | $\nu_{d_6} = 27.6$ |
| $r_{11}$ flat | | | |
| | $d_{11} = \begin{cases} 0.78 \ldots f_{min} \\ 0.52 \ldots f_M \\ 0.09 \ldots f_{max} \end{cases}$ | | |
| $r_{12} + 1.967$ | | | |
| | $d_{12} = 0.10$ | $n_{d_7} = 1.623$ | $\nu_{d_7} = 58.1$ |
| $r_{13} - 4.076$ | | | |
| | $d_{13} = 0.50$ | | |
| $r_{14} + 0.544$ | | | |
| | $d_{14} = 0.18$ | $n_{d_8} = 1.713$ | $\nu_{d_8} = 53.8$ |
| $r_{15} - 5.043$ | | | |
| | $d_{15} = 0.11$ | | |
| $r_{16} = 0.985$ | | | |
| | $d_{16} = 0.20$ | $n_{d_9} = 1.785$ | $\nu_{d_9} = 26.1$ |
| $r_{17} + 0.474$ | | | |
| | $d_{17} = 0.20$ | | |
| $r_{18} - 2.559$ | | | |
| | $d_{18} = 0.12$ | $n_{d_{10}} = 1.641$ | $\nu_{d_{10}} = 60.1$ |
| $r_{19} - 0.744$ | | | |
| | $d_{19} = 0.01$ | | |
| $r_{20} + 0.690$ | | | |
| | $d_{20} = 0.17$ | $n_{d_{11}} = 1.641$ | $\nu_{d_{11}} = 60.1$ |
| $r_{21} - 4.020$ | | | |

$f_{min} = 0.606$
$f_M = 0.979$
$f_{max} = 1.581$
$2y = 0.440$ where $r_1$ to $r_{21}$ are in millimeters the radii of curvature of boundary surfaces of lens elements, $d_1$ to $d_{20}$ are in millimeters the distances between adjacent vertices of adjacent boundary surfaces of lens elements, $n_{d_{\bar{i}}}$ to $n_{d_{\bar{i}\bar{i}}}$ are the indices of refraction and $\nu_{d_{\bar{i}}}$ to $\nu_{d_{\bar{i}\bar{i}}}$ are the Abbe numbers of the lens elements, all in a succession from the forward end to the rear end of the lens, $s'$ is the back focal length and $2y$ the image diagonal, and which data unless otherwise stated are applicable to a setting for a mean focal length $f_M$, which is the geometric mean of the shortest focal length $f_{min}$ and the longest focal length $f_{max}$ of the lens.

* * * * *